(No Model.)
G. W. MOWRER & J. R. JORDAN.
LUBRICATOR.
No. 508,485. Patented Nov. 14, 1893.
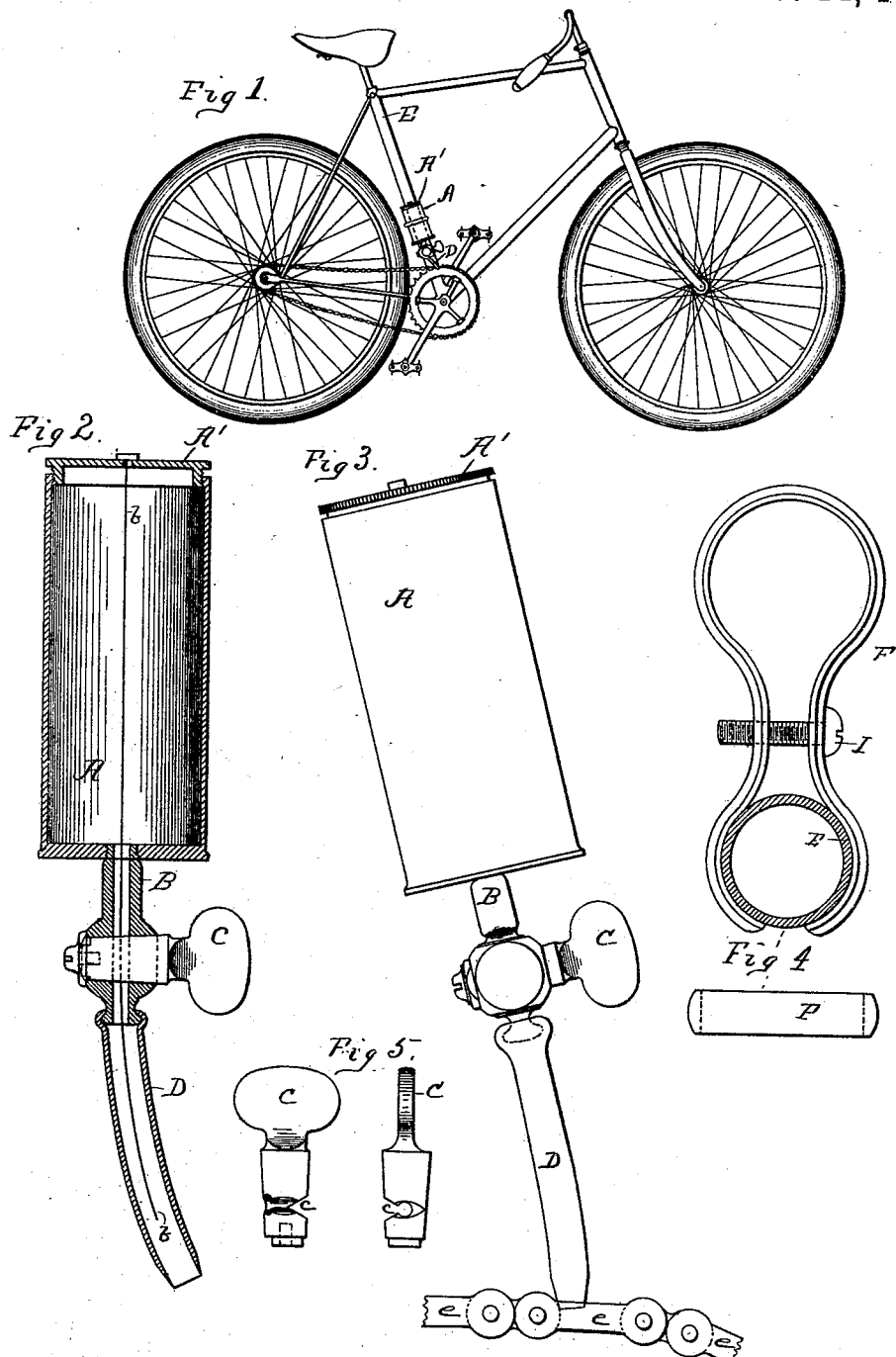
WITNESSES:
INVENTORS
BY
ATTORNEY.

UNITED STATES PATENT OFFICE.

GEORGE W. MOWRER AND JOHN R. JORDAN, OF DAYTON, OHIO.

LUBRICATOR.

SPECIFICATION forming part of Letters Patent No. 508,485, dated November 14, 1893.

Application filed July 21, 1893. Serial No. 481,153. (No model.)

*To all whom it may concern:*

Be it known that we, GEORGE W. MOWRER and JOHN R. JORDAN, of Dayton, county of Montgomery, State of Ohio, have invented a new and useful Improvement in Bicycle-Lubricators; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in lubricators, the object of which is to provide automatic means for lubricating sprocket chains.

To this end the improvements consist of a lubricant receptacle provided with a flexible and elastic feed tube, attached to the frame of the machine in a position to bring the end of said feed tube in slight contact with the sprocket chain, all of which will be detailed in the following specification and pointed out in the claims.

Referring to the accompanying drawings which form a supplement to the specification, and upon which similar letters of reference denote corresponding parts, Figure 1 is a side elevation of a bicycle having our lubricator attached to the frame thereof; Fig. 2, a vertical section of the lubricator, full size; Fig. 3, a side elevation of the lubricator, full size, and a portion of the sprocket chain; Fig. 4, detached plan and end views of the clamp; Fig. 5, detail views of the stop cock.

A indicates the casing or tube constructed of thin sheet metal with a view to reducing the weight thereof to a minimum degree while at the same time the strength of the same is sufficient to meet the demands.

A' is the cap adapted to inclose the upper end of the tube by means of a screw-threaded attachment therewith, and through the center of which a metal wire or agitator $b$ is inserted; within this tube a suitable quantity of graphite is placed, say about two thirds full, as it is well to allow some space for the agitation of the graphite.

B is a valve stem tapped into the lower end of the tube A, in which the valve cock C is placed to regulate the discharge of the graphite. This valve cock is constructed with an annular recess $c$, extending about two thirds of the circumference, and from the center thereof, the object of which is to permit of the cock being turned without coming in contact with the agitator $b$.

D designates a flexible feed tube attached to the valve stem and which projects into the openings in the links $e$ of the sprocket chain just sufficient to be subjected to vibrations at the point where the links are joined while said chain is in motion. Thus it will be seen that the graphite is discharged while the end of the flexible tube is passing over solid parts of the chain, or from one link immediately to another. This results in a saving or economical use of the lubricating material or graphite, which is discharged only in sufficient quantity to keep the gear in a properly lubricated condition; the agitator $b$, and the vibrations of the flexible and elastic tube D serving to keep the graphite in an agitated condition. In the present instance the tube D is constructed of rubber and this we deem preferable, but it, of course, may be constructed of any material that will yield readily when brought in contact with the links of the revolving chain.

The device is attached to the frame E of the bicycle so as to project over the sprocket chain a sufficient extent to place the flexible tube central of the sprocket chain; the part E of the frame not only affords a desirable location in this respect, but the device is also at that point, entirely out of the way and free from the liability of contact; the attachment is made by means of a spring metal clamp F one eye of which surrounds the frame while the other eye supports the lubricator, and is made to bind both lubricator and frame by means of screw I which penetrates the medium portion of the clamp.

Figs. 1 and 3 show the proper angle of the flexible tube when in an operative position.

Having described our invention, we desire to secure by Letters Patent—

1. The combination of the cup having a stem and regulating cock, an agitator extending through said cup and regulating cock, the elastic and flexible feed tube with one end attached to the valve stem and the other end free from any attachment, whereby it may be vibrated to feed the lubricant, as herein specified.

2. A lubricator, consisting of a cup, a valve stem and regulating cock attached thereto, the latter having a partial annular recess extending to its center, the agitator $b$ extending through the cup and penetrating said regulating cock, a flexible feed tube adapted to vibrate at one end, and having an attachment at the other end to the valve stem, substantially as herein described.

In testimony whereof we have hereunto set our hands this 10th day of July, 1893.

GEORGE W. MOWRER.
JOHN R. JORDAN.

Witnesses:
GEORGE H. WOOD,
R. JAY MCCARTY.